United States Patent
Muhr et al.

(10) Patent No.: US 10,809,420 B2
(45) Date of Patent: Oct. 20, 2020

(54) SYNTHETIC DIAMOND OPTICAL ELEMENTS

(71) Applicant: Element Six Technologies Limited, Oxfordshire (GB)

(72) Inventors: Alexander Clark Muhr, Santa Clara, CA (US); Yevgeny Vasilievich YeAnoikin, Santa Clara, CA (US); Daniel James Twitchen, Santa Clara, CA (US)

(73) Assignee: Element Six Technologies Limited (GB)

( * ) Notice: Subject to any disclaimer, the term of this patent is extended or adjusted under 35 U.S.C. 154(b) by 0 days.

(21) Appl. No.: 15/316,799

(22) PCT Filed: Jun. 10, 2015

(86) PCT No.: PCT/EP2015/062971
§ 371 (c)(1),
(2) Date: Dec. 6, 2016

(87) PCT Pub. No.: WO2015/193156
PCT Pub. Date: Dec. 23, 2015

(65) Prior Publication Data
US 2017/0242158 A1    Aug. 24, 2017

Related U.S. Application Data

(60) Provisional application No. 62/012,535, filed on Jun. 16, 2014, provisional application No. 62/047,830, filed on Sep. 9, 2014.

(30) Foreign Application Priority Data

Aug. 5, 2014    (GB) .................................... 1413811.9
Oct. 10, 2014    (GB) .................................... 1417982.4

(51) Int. Cl.
G02B 1/118    (2015.01)
G02B 5/30    (2006.01)
G02B 1/02    (2006.01)

(52) U.S. Cl.
CPC ............... *G02B 1/118* (2013.01); *G02B 1/02* (2013.01); *G02B 5/3083* (2013.01)

(58) Field of Classification Search
CPC ........ G02B 1/118; G02B 5/0278; G02B 5/30; G02B 5/3083; G02B 5/3058;
(Continued)

(56) References Cited

U.S. PATENT DOCUMENTS 5,334,342 A    8/1994    Harker et al.
7,740,824 B2 *    6/2010    Godfried ................ C30B 25/02
423/446
2011/0309265 A1    12/2011    Babinec et al.

FOREIGN PATENT DOCUMENTS

JP    1149596 A    2/1999
JP    2006507204 A    3/2006
(Continued)

OTHER PUBLICATIONS

Karlsson et al. "Diamond micro-optics: microlenses and antireflection structures surfaces for the infrared spectral region" Optics Express, vol. 11, No. 5.p. 502-57, Jan. 1, 2003.
(Continued)

*Primary Examiner* — Jie Lei
(74) *Attorney, Agent, or Firm* — Bryan Cave Leighton Paisner LLP

(57) ABSTRACT

An optical element includes a synthetic diamond material and an optical surface pattern formed directly in at least one surface of the synthetic diamond material. The optical surface pattern includes a plurality of projections separated by trenches, the projections spaced apart with a periodicity
(Continued)

d. The periodicity d is between 65 and 99% of a zeroeth order diffraction limit above which non zeroeth diffraction orders are observed at an operating wavelength $\lambda$. The optical surface pattern has a fill fraction in a range 0.1 to 0.6, the fill fraction defined as [area of projection in one periodic unit]/[area of the periodic unit]. The optical element has an absorption coefficient measured at room temperature of $\leq 0.2$ cm-1 at a wavelength of 10.6 µm.

16 Claims, 4 Drawing Sheets
(1 of 4 Drawing Sheet(s) Filed in Color)

(58) Field of Classification Search
CPC .... G02B 5/1814; G02B 1/02; G02B 26/0841; G02B 26/0808; G02B 27/46; G02B 1/10; G02B 5/18; G02B 5/32; B60R 1/088; B60R 1/086
USPC ....... 359/352, 229, 290, 599, 601, 603, 605, 359/609, 563, 566, 573, 576
See application file for complete search history.

(56) References Cited

FOREIGN PATENT DOCUMENTS

| | | |
|---|---|---|
| JP | 2012162456 A | 8/2012 |
| JP | 2013520804 A | 6/2013 |
| WO | 2004046427 | 6/2004 |
| WO | 2011103630 | 9/2011 |
| WO | 2014135544 A1 | 9/2014 |

OTHER PUBLICATIONS

Kononenko et al."Formation of antireflective surface structures on diamond films by laser patterning", Applied Physics A, Materials Science & Processing, Springer International, Jan. 1, 1999, vol. A68, Issue 1, p. 99-102.

Balmer et al. "Chemical vapour deposition synthetic diamond: materials, technology and applications",Journal of Physics:Condensed Matter, vol. 21,No. 36, Aug. 19, 2009, p. 364221.

Gombert and Blasi "The Moth-Eye Effect from Fundamentals to Commercial Exploitation". 2009, World Scientific, pp. 79-102.

Haihua et al. "Design of the wideband anti-reflective sub wavelength nanostructures", Infrared and Laser Engineering, vol. 40, Feb. 1, 2011, pp. 267-270.

Crystran "Diamond Cubic Carbon", Product Data.

Diamond Materials "The CVD diamond booklet", Mar. 13, 2005, Graph on p. 6.

Harris, D "Materials for Infrared Windows and Domes" [Daniel Harris, published by the International Society for Optical Engineering, 1999] it is disclosed at section 6.1.1.

Denatale et al. "Fabrication and characterization of diamond moth eye antireflective surfaces on Germanium, J". Appl. Phys. 71, 1388 (1992)].

Hobbs, D "Study of the Environmental and Optical Durability of AR Microstructures in Sapphire, ALON, and Diamond", www.telaztec.com.

Karlsson et al. "Transfer of continuous-relief diffractive structures into diamond by use of inductively coupled plasma dry etching", Optics Letters 26, 1752-1754 (2001).

Karlsson et al. "Fabrication and evaluation of a diamond diffractive fan-out element for high power lasers," Opt. Express 11, 191-198 (2003).

Delacroix et al. "Design, manufacturing, and performance analysis of mid-infrared achromatic half-wave plates with diamond subwavelength gratings", Applied Optics 51, 5897-5902.

Hausmann et al. "Fabrication of diamond nanowires for quantum information processing applications", Diamond and Related Materials 19, 621-629 (2010).

Burek et al. "Free-standing mechanical and photonic nanostructures in single crystal diamond", Nano Lett. 2012.

Sussmann et al. Diamond and Related Materials, 3, 1173-117, 1994.

Search Report for GB1417982.4 dated Mar. 19, 2015.

Search Report for GB1510100.9 dated Sep. 30, 2015.

International Search Report for PCT/EP2015/062971 dated Sep. 10, 2015.

* cited by examiner

SYNTHETIC DIAMOND OPTICAL ELEMENTS

FIELD OF INVENTION

The present invention relates to synthetic diamond optical elements. Certain embodiments relate to the provision of an alternative to synthetic diamond optical elements comprising thin film anti-reflective coatings. Particular embodiments relate to synthetic diamond optical elements having optical, thermal, and mechanical characteristics suitable for high power optical applications although synthetic diamond optical elements as described herein may be used in other applications where the provision of an antireflective coating is undesirable due to factors including mechanical robustness, chemical inertness, low absorbance, and high thermal conductivity. Certain further embodiments relate to the provision of birefringent diamond optical elements having these characteristics.

BACKGROUND OF INVENTION

Standard thin film anti-reflective coatings on synthetic diamond optical elements have excellent performance in terms of minimising reflection, but are limited in high power optical systems due to the ease with which they are damaged. Due to high absorbance and/or poor thermal conductivity the anti-reflective coating tends to be the weak point in any synthetic diamond window resulting in a synthetic diamond window with a low laser induced damage threshold (LIDT). Furthermore, even if the absorption level of a thin film anti-reflective coating is relatively low, the thin film can still fail in high power density optical applications. For example, for a 20 kW infrared laser system damage of thin film anti-reflective coatings is problematic and current thin film anti-reflective coating solutions are unlikely to be compatible with laser systems operating at 40 kW or more. Such high power laser systems are desirable for a number of applications including laser produced plasma (LPP) extreme ultraviolet (EUV) lithography systems to drive integrated circuit processing to smaller dimensions. Such extreme optical applications will require a synthetic diamond window capable of handling extreme power densities and this will require the combination of: (1) a synthetic diamond material with the required dimensions and desired bulk optical characteristics including low optical reflectance/absorption/scatter; and; (2) an anti-reflective surface finish capable of handling extreme power densities. Thin film anti-reflective coatings can also be problematic in terms of their mechanical integrity, e.g. if subjected to scratching or abrasion.

As an alternative to thin film anti-reflective coatings, it is known that anti-reflective surface patterns such as moth-eye structures can be formed directly in the surface of an optical window material in order to provide an anti-reflective surface finish without the requirement of a coating. While such anti-reflective surface patterns have been successfully fabricated in a range of optical window materials, the application of this technology to synthetic diamond windows has proved problematic. The anti-reflective performance of such surface finishes has been variable due to the difficulty in processing precisely defined surface patterns into diamond material because of the extreme hardness, low toughness, and chemical inertness of diamond materials. Surface processing of polycrystalline diamond materials is further complicated by the fact that they comprise diamond grains having different orientations and different processing rates. Furthermore, the processing methods required to form anti-reflective surface structures in diamond material have resulted in significant surface and sub-surface crystal damage being incorporated into the diamond material. This surface and sub-surface damage in the synthetic diamond window causes a number of inter-related detrimental effects including: (1) a reduction in the laser induced damage threshold of the synthetic diamond window; (2) a reduction in the power at which the synthetic diamond window can operate; and (3) a reduction in the optical performance of the synthetic diamond window as a result of beam aberrations caused by the surface and sub-surface damage. As such it would be desirable to develop a process which forms precisely defined anti-reflective surface structure into a synthetic diamond window without introducing surface and sub-surface crystal damage so as to achieve a synthetic diamond window which has a low absorbance, a low reflectance, a high laser induced damage threshold, and high optical performance with minimal beam aberrations on transmission through the synthetic diamond window. In addition, it would be desirable to provide a process which is low cost, compatible with existing materials processing, and scalable over large areas.

In relation to the above, a number of prior art documents have disclosed techniques for fabricating anti-reflective surface structure into diamond window materials as discussed below. However, it is believed that none of the prior art techniques have achieved the combination of features as identified above.

In "Materials for Infrared Windows and Domes" [Daniel Harris, published by The International Society for Optical Engineering, 1999] it is disclosed at section 6.1.1 that a moth eye surface structure can be formed directly in diamond material to reduce reflection. Here it is disclosed that such a surface structure can be fabricated by first etching a reverse moth eye structure into silicon by lithographic techniques and then growing diamond material on the etched surface by chemical vapour deposition. The silicon is then dissolved to leave the diamond material with a moth eye structure. It is described that a multi-layer structure including an outer diamond layer with a flat outer surface has a reflectance of about 18% at a wavelength of 10 µm, the reflectance being dominated by single-surface reflectance from the front face of the outer diamond layer (15%). When the flat diamond outer surface is replaced by a moth eye structure, reflectance is reduced to 7% at a wavelength of 10 µm.

One problem with this approach is that the reflectance is still relatively high and this is due to the fact that precisely defined anti-reflective structures cannot easily be achieved in diamond material by the technique of etching a reverse moth eye structure into a substrate and then growing diamond material on the etched surface by chemical vapour deposition. Furthermore, growth of diamond material on patterned substrates can lead to an increase in crystal defects such as dislocations within the diamond material which adversely affect the optical properties of the diamond material. Yet a further weakness of this approach is that the final optical element will inevitably include early stage nucleation diamond which has reduced thermal conductance and increased optical absorbance.

U.S. Pat. No. 5,334,342 discloses a similar method of fabricating moth-eye surface structures in diamond material by patterning a reverse moth eye structure into a substrate, growing diamond material on the patterned substrate, and then removing the substrate to leave the diamond material with a moth eye surface structure.

J. F. DeNatale et al [Fabrication and characterization of diamond moth eye antireflective surfaces on Germanium, J. Appl. Phys. 71, 1388 (1992)] have disclosed a similar approach by patterning a germanium substrate with a surface relief (moth eye) structure and then over-growing a thin diamond film on the patterned substrate such that the thin diamond film retains the underlying surface structure of the patterned substrate. It is described that the progressive gradation in the effective refractive index between air and the composite substrate has reduced Fresnel reflection losses to below 1%. This provides a means of overcoming the high refractive index and surface roughness considerations that often limit optical applications of polycrystalline diamond thin films. However, there is no disclosure of how to fabricate such moth-eye structures in free-standing diamond windows and although reflection losses have been reduced to below 1%, there is no disclosure of the laser induced damage threshold of the diamond material which will be sensitive to the quality of the diamond material. The quality of the diamond material in this instance will likely be poor as it is grown on a patterned germanium substrate.

T. V. Kononenko [Formation of antireflective surface structures on diamond films by laser patterning, Applied Physics A, January 1999, Volume 68, Issue 1, pp 99-102] discloses an alternative to the substrate patterning and diamond over-growth technique disclosed in the previously described prior art. This paper describes diamond surface microstructuring by a laser ablation technique. The optical transmission of the diamond films was found to increase from 70% to 80% at a wavelength of 10.6 µm by forming a microstructured surface by laser ablation.

Douglas Hobbs ["Study of the Environmental and Optical Durability of AR Microstructures in Sapphire, ALON, and Diamond", www.telaztec.com] has also reported the fabrication of moth eye anti-reflective surface microstructures directly in diamond material. It is reported that diamond windows with anti-reflective surface structures have been fabricated which have a transmittance of approximately 80% at a wavelength of 10 µm which compares with a value of approximately 70% for an untreated diamond window. These results appear similar to those reported by Kononenko using a laser ablation technique for patterning a diamond surface.

Hobbs also discloses that the anti-reflective microstructured diamond windows were tested for laser induced damage threshold using a pulsed $CO_2$ laser operating at 9.56 µm with a 100 ns pulse length and a pulse repetition frequency of 4 Hz. It is indicated that results of the tests were variable and inconsistent due to the nature of the diamond material but that the damage thresholds measured were in a range 50 to 100 $J/cm^2$, a level much higher than can be achieved with thin-film anti-reflective coatings.

Two key points may be noted from the Hobbs paper. First, the transmittance value of 80% is still rather low and this would indicate that the quality of the diamond material is relatively poor, the surface structures fabricated in the diamond windows are not precisely defined, or that significant surface or sub-surface damage has been introduced into the diamond crystal structure when forming anti-reflective surface micro-structures. Secondly, the paper does not indicate how the anti-reflective surface structures were fabricated in the diamond windows.

Previously described methods of fabricating anti-reflective surface structures in diamond windows have involved either substrate patterning and diamond overgrowth or direct patterning via laser ablation. An alternative technique is to directly etch anti-reflective surface structures into diamond windows. For example, various publications from Uppsala University in Sweden have focussed on inductively coupled plasma etching of surface structures in diamond material including: M. Karlsson, K. Hjort, and F. Nikolajeff, "Transfer of continuous-relief diffractive structures into diamond by use of inductively coupled plasma dry etching", Optics Letters 26, 1752-1754 (2001); M. Karlsson, and F. Nikolajeff, "Fabrication and evaluation of a diamond diffractive fan-out element for high power lasers," Opt. Express 11, 191-198 (2003); and M. Karlsson, and F. Nikolajeff, "Diamond micro-optics: Microlenses and antireflection structured surfaces for the infrared spectral region," Opt. Express 11, 502-507 (2003).

The Uppsala group have indicated that diamond-based optics provide an attractive alternative for high-power laser optics due to their damage resistance, reduced thermal lensing, and transparency from the UV to the far-IR spectral regions. The Uppsala group have highlighted the need for better surface patterning for diamond-based optics and have proposed an inductively coupled plasma etching approach which involves patterning a resist layer on an optical-quality synthetic diamond using direct-write electron-beam lithography followed by dry etching in an inductively coupled plasma (ICP). The gases used for the diamond etching are $O_2$ and Ar and a typical ICP etch recipe is disclosed as comprising: gas flows of 7 sccm (standard cubic centimeters per minute) of $O_2$, and 8 sccm of Ar; a chamber pressure of 2.5 mTorr; an ICP power of 600 W; bias voltages varied between −100 and −180 V; and sample etch times of between 2 and 20 minutes.

It has been indicated that by correctly designing and fabricating sub-wavelength anti-reflective structures on both sides of a diamond window, it is possible to increase the transmission at a wavelength of 10.6 µm from 71% (unstructured diamond) to 97% or more (for microstructured diamond). It is indicated that this improvement in transmission is very important for high-power lasers, in which even a fraction of the scattered high optical power can lead to severe problems. Applications of this technology are described as including outcoupling windows for neodymium-doped yttrium aluminum garnet (Nd:YAG) or $CO_2$ lasers, satellite windows, and in x-ray optics. It is indicated that in these applications, it is mainly the high thermal conductivity, the high laser damage threshold, and the high wear resistance of the optical windows that are the driving factors.

Despite the above progress in fabricating anti-reflective surface structures into diamond windows, there is still a need to provide improved anti-reflective surface structures. It would be desirable to develop a process which forms precisely defined anti-reflective surface structure into a synthetic diamond window without introducing surface and sub-surface crystal damage so as to achieve a synthetic diamond window which has a low reflectance, a high laser induced damage threshold, and high optical performance with minimal beam aberrations on transmission through the synthetic diamond window. In this regard, while a number of prior art documents have disclosed techniques for fabricating anti-reflective surface structure into diamond window material as previously discussed, it is believed that none of the prior art techniques have achieved this desired combination of features. Furthermore, it has also been noted that a direct-write electron-beam lithography process for patterning of the resist prior to etching is time consuming and expensive.

In light of the above, it is an aim of embodiments of the present invention to provide a synthetic diamond optical element comprising an anti-reflective surface pattern formed directly in the surface of the synthetic diamond material and which has low absorbance and low reflectance while also having low surface and sub-surface crystal damage thus exhibiting a high laser induced damage threshold. It is a further aim to develop a technique for fabricating such anti-reflective surface patterns in diamond material which is relatively quick, low cost, and within acceptable processing errors.

The aforementioned background information relates to the provision of a synthetic diamond optical element comprising an anti-reflective surface pattern formed directly in the surface of the synthetic diamond material. For certain applications it is required to provide a birefringent optical element and similar problems arise. For example, quarter and half wave plates are essential optical components in many applications and allow for the polarization of incident light to be manipulated. Current waveplate technology suffers from various limitations including waveplate size and laser induced damage threshold (LIDT). In particular for high power laser applications, LIDT can be problematic due to heating of the waveplate substrate and/or heating of any coating on the waveplate surface.

For zero-order waveplates, laser induced damage can be especially problematic. This is because zero order waveplates are typically made from two pieces of birefringent material cemented together at a particular orientation relative to one another. This thin cement layer typically absorbs more laser energy than the birefringent material and can cause heating problems.

As an alternative to the use of two pieces of birefringent material cemented together, it is known that birefringent surface patterns can be formed directly in the surface of an optical window material in order to provide a birefringent surface finish without the requirement of a separate coating material. While such birefringent surface patterns have been successfully fabricated in a range of optical window materials, the application of this technology to synthetic diamond windows has proved problematic for the same reasons as outlined above for antireflective surface patterns.

The basic idea of providing diamond subwavelength gratings in known in the art [see Delacroix et al., "Design, manufacturing, and performance analysis of mid-infrared achromatic half-wave plates with diamond subwavelength gratings", Applied Optics 51, 5897-5902]. However, as stated previously for antireflective surface patterns, there is still a need to provide improved birefringent surface structures. It would be desirable to develop a process which forms precisely defined birefringent surface structure into a synthetic diamond window without introducing surface and sub-surface crystal damage so as to achieve a synthetic diamond window which has a high laser induced damage threshold and high optical performance with minimal beam aberrations on transmission through the synthetic diamond window. In this regard, while a number of prior art documents have disclosed techniques for fabricating surface structure into diamond window material as previously discussed, it is believed that none of the prior art techniques have achieved this desired combination of features.

In light of the above, it is also an aim of embodiments of the present invention to provide a synthetic diamond optical element comprising a birefringent surface pattern formed directly in the surface of the synthetic diamond material and which has low surface and sub-surface crystal damage thus exhibiting a high laser induced damage threshold. It is a further aim to develop a technique for fabricating such birefringent surface patterns in diamond material which is relatively quick, low cost, and within acceptable processing errors.

SUMMARY OF INVENTION

The present applicant's earlier patent application PCT/EP2014/054183 describes an inductively coupled plasma reactive ion etching (ICP RIE) process for fabricating an anti-reflective surface pattern directly in the surface of a synthetic diamond material which has low absorbance and low reflectance while also having low surface and sub-surface crystal damage thus exhibiting a high laser induced damage threshold. The present applicant has found that by etching an all diamond moth-eye pattern into the surface of an all diamond window using such a technique, it is possible to reduce reflection at that surface to <1% while still maintaining a high laser induced damage threshold.

Following this work, the present applicant has noted that the effectiveness of a moth-eye pattern in reducing surface reflections is dependent on the geometry of the surface features and the ability to accurately fabricate a specific geometric pattern. Small deviations from ideal surface structure geometry due to imperfect processing are inevitable and can cause surface reflections to not be reduced below 1% per surface. Deviations from ideal surface structure geometry are most likely to occur in locations where the aspect ratio of the etched area is high. Aspect ratio in this case is defined as (depth of etched area)/(width of etched area). Such issues are particularly problematic when trying to provide anti-reflective surface patterns in diamond materials, particularly polycrystalline diamond materials, as described in the background section of this specification.

It has now been found that increasing the periodicity of antireflective surface structures in diamond materials has a twofold benefit: (i) it reduces sensitivity of antireflective performance to deviations from ideal structure; and (ii) it decreases the required depth/width aspect ratio of antireflective surface structures which enables them to be formed more precisely. These additive effects suggest increasing periodicity is advantageous, particularly for a material like diamond which is difficult to process to a high degree of precision.

Although increasing structure periodicity reduces sensitivity to fabrication errors and increases the ability to fabricate the structures without error as described above, there is a limit to structure periodicity. At a certain periodicity, the moth-eye surface will begin to act as a diffraction grating and light will be lost from the zeroeth grating order to additional transmitted and reflected grating orders. The ideal structure periodicity is determined by the largest value at which additional, non-zeroeth, grating orders are suppressed.

In addition, it has also been found that the optical surface pattern should have a fill fraction within a defined range, the fill fraction defined as [area of projection in one periodic unit]/[area of the periodic unit]. This area based 2-dimension fill fraction parameter has been found to be important to functional performance and is distinct from a 1-dimensional fill factor parameter defined as [width of projection]/[length of periodic unit]. In this regard, it should be noted that the lithographic processing of diamond doesn't result in perfectly shaped projections and thus a 1-dimensional fill factor parameter cannot be readily converted into a 2-dimensional fill factor parameter.

Similar design rules also apply for other diamond optical surface structures such as birefringent surface patterns.

In light of the above, in accordance with a first aspect of the present invention there is provided an optical element comprising:

synthetic diamond material; and
an optical surface pattern formed directly in at least one surface of the synthetic diamond material,
wherein the optical surface pattern comprises a plurality of projections separated by trenches, the projections spaced apart with a periodicity d,
wherein the periodicity d is between 65 and 99% of a zeroeth order diffraction limit above which non zeroeth diffraction orders are observed at an operating wavelength λ,
wherein the optical surface pattern has a fill fraction in a range 0.1 to 0.6, the fill fraction defined as [area of projection in one periodic unit]/[area of the periodic unit], and
wherein the optical element has an absorption coefficient measured at room temperature of ≤0.2 cm$^{-1}$ at a wavelength of 10.6 μm.

In addition to the above, at least for birefringent surface patterns, the optical surface pattern may be configured with trenches having a depth-to-width aspect ratio in a range 1.2 to 3 (although a wider range of 0.8 to 3 may be applicable for certain antireflective surface patterns). In this regard, a lower depth-to-width ratio has been found to be more readily fabricating into diamond materials in a more precise manner but if the depth-to-width ratio is too low then non-zero grating orders can become visible with increasing structure periodicity.

Further still, while for certain applications a transmittance value below 97% may be acceptable, for many optical applications a higher transmittance value is required and the presently described etching techniques have been found to reliably achieve diamond optical elements having a transmittance above 97% (e.g. consistently achieve transmittance values of at least 98%). In addition to the above, many applications require a surface pattern which meets stringent requirements as described above over a relatively large area (e.g. at least 100 mm$^2$ and usually much larger for many applications). The presently described etching techniques have been found to reliably achieve diamond optical elements having the required parameters over large areas to meet commercial requirements.

According to a second aspect of the present invention there is provided an optical system comprising:
an optical element as defined above; and
a light source configured to generate light at a power of at least 300 W, 500 W, 1 kW, 3 kW, 5 kW, 10 kW, 15 kW, 20 kW, 25 kW, 30 kW, 35 kW, 40 kW, 45 kW, or 50 kW and transmit said light through the optical element.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the present invention and to show how the same may be carried into effect, embodiments of the present invention will now be described by way of example only with reference to the accompanying drawings, in which.

DETAILED DESCRIPTION

Figure 1:
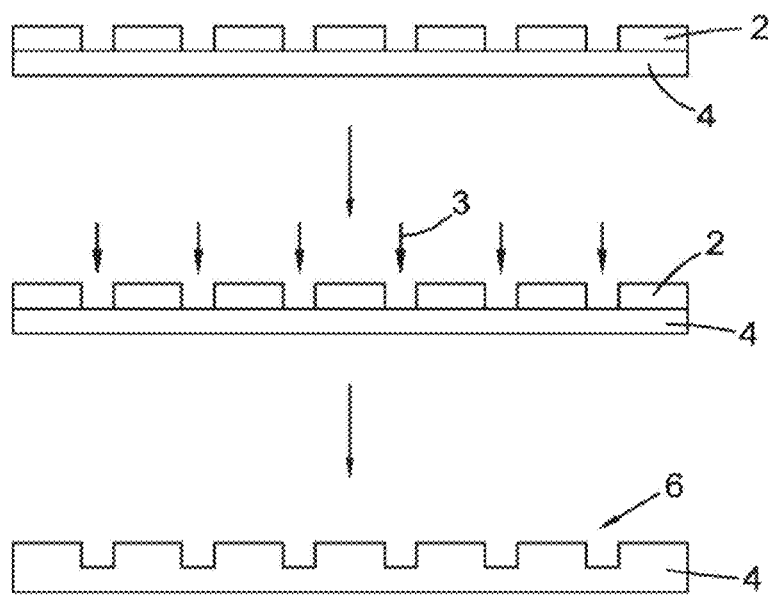
FIG. 1 shows a schematic flow diagram of a method of fabricating an optical element comprising synthetic diamond material with an optical surface finish pattern formed directly in a surface of the synthetic diamond material.

As described in PCT/EP2014/054183, the present applicant has realized that recent developments in processing of high purity single crystal CVD diamond materials in the field of quantum sensing and quantum information processing can be transferred to the field of high power polycrystalline CVD diamond laser optics to solve the problems outlined in the background section of this specification and achieve the fabrication of synthetic diamond optical elements which have low reflectance and high transmittance while also having low surface and sub-surface crystal damage thus exhibiting a high laser induced damage threshold.

Research into the use of high purity single crystal CVD diamond materials in the field of quantum sensing and quantum information processing is focussed on a particularly kind of point defect found within the diamond crystal lattice, namely the negatively changed nitrogen-vacancy defect (NV⁻). The NV⁻ defect has an electronic spin which can be manipulated to function as a quantum bit or alternatively as a quantum sensing element. The NV⁻ defect can be optically excited, manipulated using microwaves, and emits fluorescent light which is characteristic of its electronic spin state.

One requirement for quantum sensing and quantum information processing applications is that the NV⁻ electronic spin defect should have a long quantum coherence time and this requires the NV⁻ electronic spin defect to be located in a highly pure diamond lattice environment which has a low concentration of crystal defects and low internal stress which can otherwise detrimentally reduce the quantum coherence time of the NV⁻ electronic spin defects disposed within the diamond crystal lattice. Another requirement for quantum sensing and quantum information processing applications is that the fluorescent light emitted from the NV⁻ electronic spin defects needs to be efficiently out-coupled from the diamond material to a suitable processor or detector configuration and in this regard it is desirable to fabricate nanowires, optical waveguide structures, and photonic cavity structures into the diamond material in order to effectively out-couple photons emitted from the NV⁻ electronic spin defects. Inductively coupled plasma etching (similar to that used by Uppsala University and discussed previously in the background section of this specification) has been used to fabricate such optical structures. However, it has been found that fabrication processes tend to introduce surface and sub-surface damage into the diamond crystal structure which adversely effects the quantum coherence time of the near-surface NV⁻ electronic spin defects coupled to the optical surface structures. Furthermore, it has been found that the quality of the desired surface structures and the formation of unwanted etch grass between the desired surface structures is sensitive to the type of etch mask used and to the etch conditions. As such, recent work by groups developing structures for diamond quantum devices has focussed on refining the inductively coupled plasma (ICP) etching process in order to allow fabrication of optical out-coupling structures for near-surface NV⁻ electronic spin defects without introducing significant quantities of surface and sub-surface damage into the diamond crystal structure while at the same time achieving well defined optical structures in the diamond surface without unwanted etch grass disposed between the structures. This work is described in a number of publications including: B. Hausmann et al, Fabrication of diamond nanowires for quantum information processing applications, Diamond and Related Materials 19, 621-629 (2010); M. Burek et al., Free-standing mechanical and photonic nanostructures in single crystal diamond, Nano Lett. 2012; and US2001/0309265.

Groups developing structures for diamond quantum devices have experimented with a variety of different combinations of gas flow rates, ICP powers, and pressures for fabricating optical out-coupling structures in single crystal CVD diamond material without introducing significant quantities of surface and sub-surface damage into the diamond crystal structure. For example, the following inductively coupled plasma reactive ion etching (ICP RIE) recipe is reported in the literature as being suitable for this purpose: an oxygen etchant which has an oxygen gas flow of between 30 to 50 sccm $O_2$, a chamber pressure of approximately 10 mTorr, and an ICP power of approximately 700 W. It is reported that this etch recipe allows the formation of very well defined surface structures while avoiding the formation of etch grass between the desired surface structures. In addition, it is reported that the shape and quantity of the etched optical structures in a diamond surface can be controlled by varying the ICP power during the etching process. For example, in the fabrication of nano-wires in the surface of single crystal CVD diamond material a multi-step ICP RIE process is reported including applying an ICP power of 700 W for two minutes, an ICP power of 600 W for three minutes, and an ICP power of 1000 W for five minutes. Further still, a number of different etch masks are reported in the diamond quantum device literature including $Al_2O_3$ particles, Au particles, $SiO_2$ particles, evaporated Au, and FOx e-beam resist.

In light of the above, it is evident that groups developing structures for diamond quantum devices based on defects in the diamond lattice have successfully developed an ICP RIE process which is capable of forming well defined surface structures in diamond material without forming unwanted etch grass between such structures and without introducing a large amount of surface and sub-surface crystal damage. This technology has been developed specifically for efficiently out-coupling fluorescent light emitted from the NV⁻ electronic spin defects in quantum sensing and quantum information processing applications including the formation of nanowires, optical waveguide structures, and photonic cavity structures into the diamond material in order to effectively out-couple photons emitted from the NV⁻ electronic spin defects.

The present applicant has realized that the requirements for out-coupling structures such as nanowires, optical waveguide structures, and photonic cavity structures in quantum sensing and quantum information processing applications are very similar to the requirements for the fabrication of better anti-reflective surface patterns in transmissive diamond windows suitable for high power laser applications. That is, the etching technology developed for quantum sensing and quantum information processing applications can be transferred into the field of transmissive optics to provide a synthetic diamond window for high power laser applications comprising an anti-reflective surface pattern, such as a moth-eye pattern, formed directly in the surface of the synthetic diamond window and which has low reflectance and high transmittance while also having low surface and sub-surface crystal damage thus exhibiting a high laser induced damage threshold. While the etching technology developed for quantum sensing and quantum information processing applications is utilized for etching nanowires, optical waveguide structures, and photonic cavity structures in single crystal CVD diamond material comprising fluorescent NV⁻ defects, in accordance with embodiments of the present invention the etching technology is applied to low absorbance optical quality diamond material, such as high quality polycrystalline CVD diamond material, to fabricate low surface damage anti-reflective surface finishes, such as moth-eye structures, therein and thus produce optical elements having a combination of low absorbance, low reflectance, and a high laser induced damage threshold.

A method of fabricating an optical element is provided as illustrated in FIG. 1 which comprises:

forming a patterned resist layer 2 on at least one surface of a synthetic diamond material 4;

etching 3 the at least one surface of the synthetic diamond material 4 through the patterned resist layer 2; and removing the patterned resist layer to leave an anti-reflective surface pattern 6 formed directly in the at least one surface of the synthetic diamond material 4, wherein the etching comprises, for example, an inductively coupled plasma reactive ion etching (ICP RIE) process comprising an oxygen gas flow rate of between 20 to 50 sccm $O_2$, a chamber pressure of between 5 and 20 mTorr, and an ICP power of between 600 and 1100 W.

Optionally, the inductively coupled plasma reactive ion etching process comprises one or more of: an oxygen flow rate between 25 and 35 sccm $O_2$; a chamber pressure between 7 and 15 mTorr; and an ICP power between 700 and 1000 W. The inductively coupled plasma reactive ion etching process may also comprise multiple steps with different ICP powers to control the surface profile of the anti-reflective surface pattern. Furthermore, the patterned resist layer may be formed from one of: $Al_2O_3$ particles; Au particles; $SiO_2$ particles; evaporated Au; and FOx e-beam resist. In practice, the resist is selected to be tolerant to a controlled deep etch. For example, a resist may be selected to be compatible with the formation of surface etch features having a height equal to or greater than 2 μm, 4 μm, 6 μm, 8 μm, or 10 μm.

Cyclic etching using different etch chemistries may also be utilized to control the etching and patterning process. For example, halogen based etches such as chlorine-argon plasma etches may also be used in addition to, for example, oxygen plasma etching as described above.

In addition to the above, it has been noted that certain prior art approaches as described in the background section utilize a direct-write electron-beam lithography process for patterning of the resist prior to etching. This direct-write electron-beam lithography process can be somewhat time consuming and expensive. As such, according to one alternative option which may provide a faster and more cost effective route to patterning the resist layer, it is proposed that the patterned resist layer is formed using an interference lithography technique. Interference lithography techniques are already known in the art for forming moth eye antireflective structures in other materials. For example, Telaztec™ utilize this approach for fabricating moth eye antireflective structures in a range of materials. It is proposed here that such an interference lithography technique for patterning the resist may be combined with a low surface/sub-surface crystal damage etching technology as a route to providing a commercially viable way of fabricating diamond optical windows with low absorbance, low reflectance, and a high laser induced damage threshold for high power laser applications.

Applying the aforementioned methodology, it is possible to fabricate a synthetic diamond optical element having an anti-reflective surface pattern formed directly in at least one surface of the synthetic diamond material, wherein the optical element has a low absorption coefficient, a low reflectance, and a high laser induced damage threshold. However, as described in the summary of invention section, the ease with which such structures can be produced in an industrial manufacturing process in a consistent and reproducible manner has been found to be dependent on the geometry of the surface structures and the ability to accurately fabricate specific geometric patterns in diamond materials.

Figure 2:
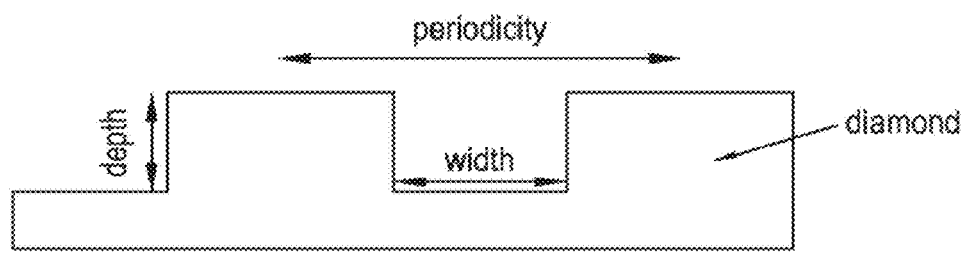
FIG. 2 shows a schematic illustration of a portion of an anti-reflective pattern in a surface of a synthetic diamond optical element indicating depth, width, and periodicity dimensional parameters.

FIG. 2 shows a schematic illustration of a portion of an anti-reflective pattern in a surface of a synthetic diamond optical element indicating depth, width, and periodicity dimensional parameters. The present applicant has found that increasing the periodicity of moth-eye surface structures in diamond materials has a twofold benefit as described below.

The first benefit of increasing the periodicity of moth-eye surface structures in diamond materials is that the anti-reflective properties of the diamond surface become less sensitive to deviations from ideal structure geometry that occur within the plane of the surface. This has a significant effect in increasing the margin for error during the moth-eye fabrication process.

The second benefit of increasing the periodicity the periodicity of moth-eye surface structures in diamond materials is that the aspect ratio of the etched areas can be reduced for an ideal moth-eye surface. This is because the ideal etch depth is constant for any structure periodicity and because the ideal surface pattern's fill fraction changes only slightly with increased periodicity. Fill fraction is defined as (area of surface structure in one periodic unit)/(area of entire periodic unit). By allowing a decrease in the aspect ratio of the etched areas by increasing the periodicity of the surface structure, the ability to etch moth-eye structures without error in diamond materials is increased.

Although increasing structure periodicity reduces sensitivity to fabrication errors and increases the ability to fabricate the structures without error as described above, there is a limit to structure periodicity. At a certain periodicity, the moth-eye surface will begin to act as a diffraction grating and light will be lost from the zeroeth grating order to additional transmitted and reflected grating orders. The ideal structure periodicity is determined by the largest value at which additional, non-zeroeth, grating orders are suppressed.

In addition, it has also been found that the optical surface pattern should have a fill fraction within a defined range, the fill fraction defined as [area of projection in one periodic unit]/[area of the periodic unit]. This area based 2-dimension fill fraction parameter has been found to be important to functional performance and is distinct from a 1-dimensional fill factor parameter defined as [width of projection]/[length of periodic unit]. In this regard, it should be noted that the lithographic processing of diamond doesn't result in perfectly shaped projections and thus a 1-dimensional fill factor parameter cannot be readily converted into a 2-dimensional fill factor parameter.

In light of the above, there is provided an optical element comprising:
  synthetic diamond material; and
  an anti-reflective surface pattern formed directly in at least one surface of the synthetic diamond material,
  wherein the anti-reflective surface pattern comprises a plurality of projections separated by trenches, the projections spaced apart with a periodicity d,
  wherein the periodicity d is between 65 and 99% of a zeroeth order diffraction limit above which non zeroeth diffraction orders are observed at an operating wavelength λ,
  wherein the optical surface pattern has a fill fraction in a range 0.1 to 0.6, the fill fraction defined as [area of projection in one periodic unit]/[area of the periodic unit], and
  wherein the optical element has an absorption coefficient measured at room temperature of ≤0.2 $cm^{-1}$ at a wavelength of 10.6 μm.

The periodicity d is the spacing of projections in the anti-reflective surface pattern and can be determined by measuring the distance between the centres of adjacent projections (or more generally the distance from a point on one projection to a corresponding point on an adjacent projection). Usually, an ideal anti-reflective surface pattern will be one which is perfectly periodic such that the spacing between any two adjacent projections in the anti-reflective surface pattern is identical to any other two adjacent projections in the anti-reflective surface pattern. However, as will be appreciated from the present discussion, by ensuring that the periodicity d is between 65 and 99% of the zeroeth order diffraction limit, small deviations or variations in the anti-reflective surface pattern can be tolerated. An average periodicity over a number of projections can easily be determined by measuring the distance over a number of projections n and then dividing by (n−1). In this case, the average periodicity should be between 65 and 99% of the zeroeth order diffraction limit.

According to certain embodiments the periodicity d may be no less than 70%, 80%, 85%, or 87% of the zeroeth order diffraction limit and/or no more than 97%, 95%, or 92% of the zeroeth order diffraction limit and/or any combination of these upper and lower limits.

The operating wavelength λ may be selected from one of: 10.6 µm; 2.2 µm; 1.06 µm; 532 nm; 355 nm; or 266 nm but is not limited to these wavelengths. For example, if the operating wavelength λ is 10.6 µm, the zeroeth order diffraction limit is 4.45 µm, and the periodicity d of the anti-reflective surface pattern is in a range 3 to 4.40 µm. In this case, the periodicity d may be no less than 3.20 µm, 3.40 µm, 3.60 µm, or 3.80 µm and/or no more than 4.30 µm, 4.20 µm, or 4.10 µm and/or any combination of these upper and lower limits.

The zeroeth order diffraction limit for the periodicity d above which non zeroeth diffraction orders are observed at an operating wavelength λ may be calculated as follows:

$$d_x < \lambda / \left\{ [\max(n_s^2, n_i^2) - (n_i \sin\theta \sin\phi)^2]^{\frac{1}{2}} + |n_i \sin\theta \cos\phi| \right\}$$

$$d_y < \lambda / \left\{ [\max(n_s^2, n_i^2) - (n_i \sin\theta \cos\phi)^2]^{\frac{1}{2}} + |n_i \sin\theta \sin\phi| \right\}$$

where θ and ϕ are the polar and azimuthal angles respectively and $n_s$ and $n_i$ are the refractive indices of the substrate and incident medium respectively. For an air-diamond interface $n_s$=2.38 and $n_i$=1. If the angle of incidence is assumed to be normal to the diamond surface then θ=ϕ=0 and these equations simplify to:

$$d_x < \lambda / n_s$$

$$d_y < \lambda / n_s$$

As described above, increasing the periodicity of the anti-reflective surface pattern allows a reduction in the depth-to-width aspect ratio of the trenches in the surface structure. For example, the trenches of the anti-reflective surface pattern may have a depth-to-width aspect ratio of less than 3, 2, or 1.5. Such relatively wide trenches are more readily fabricating into diamond materials in a more precise manner. However, it should be noted that the desired depth of the trenches remains constant at about 1.72 microns as structure periodicity is increased. Reduction in aspect ratio when increasing structure periodicity stems from increasing the width of the area etched. Aspect ratio of trenches is limited to a minimum of about 1.2 due to appearance of non-zero grating orders when further increasing structure periodicity.

The above values are for the depth-to-width aspect ratio in a moth-eye structure operating at 10.6 microns. However, in general this preferred aspect ratio will remain approximately constant as wavelength is either scaled up or down. Even though changing operating wavelength will affect the desired structure periodicity, desired fill fraction will remain fairly similar and desired etch depth will scale linearly. For example, if the operating wavelength is changed to 5.3 microns then etch depth would be scaled by ½ and etch width would be scaled by approximately ½, leaving aspect ratio approximately unchanged.

Other examples are summarized in the table below:

| Wavelength | Periodicity | Rectangle top width | Top fill fraction | Etch depth | Aspect ratio | Transmission |
|---|---|---|---|---|---|---|
| 10.6 um | 4 um | 2.5 um | 0.4 | 1.85 um | 1.23 | ~100% |
| 2.2 um | 0.8 um | 0.51 um | 0.4 | 0.39 um | 1.31 | ~100% |
| 1 um | 0.35 um | 0.22 um | 0.4 | 0.172 um | 1.34 | ~100% |

Figure 3:
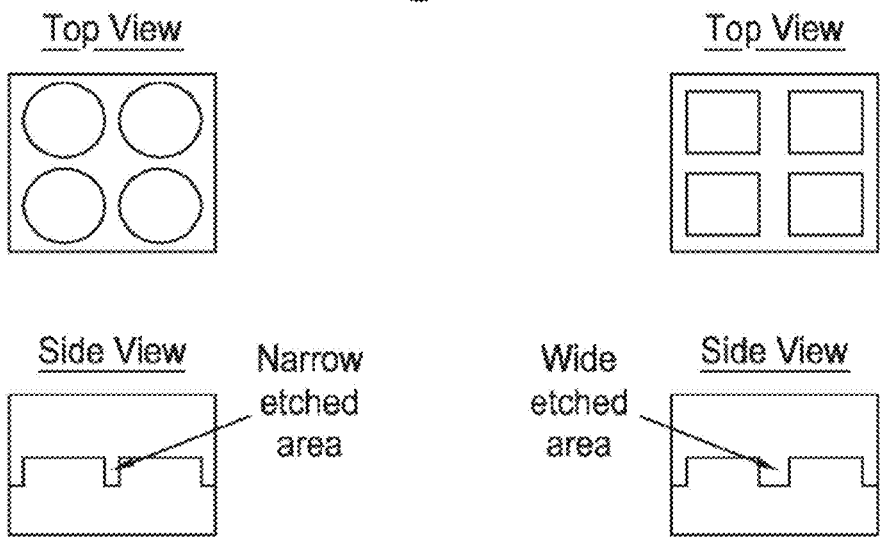
FIG. 3 shows a schematic illustration of anti-reflective surface patterns having cylindrical and square projections indicating that anti-reflective surface patterns comprising square projections have a wider etched area and a lower depth-to-width aspect ratio.

Anti-reflective surface patterns may comprise projections which have a variety of shapes including, for example, squares, rectangles, cylinders, holes, or hexagons. Sidewalls may also have some amount of taper. It has been found that the required aspect ratio of the trenches is also dependent upon the shape of the structures being etched. For example, it has been found that anti-reflective surface patterns comprising projections which have a square or rectangular cross-sectional shape are advantageous compared to cylinders. Periodic square structures maintain a constant separation (and therefore aspect ratio) along each face for a given fill fraction and periodicity. When considering cylindrical structures of the same fill fraction and periodicity, the minimum separation between cylinders will be significantly less than that of the constant separation of square structures. For this reason it is advantageous to etch square structures as opposed to cylinders. As an example, ideal square structures optimized for 10.6 µm with a periodicity of 4 µm will have a minimum aspect ratio of 1.27 while cylindrical structures of the same periodicity will have a minimum aspect ratio of 1.72. FIG. 3 shows a schematic illustration of anti-reflective surface patterns having cylindrical and square projections indicating that anti-reflective surface patterns comprising square projections have a wider etched area and a lower depth-to-width aspect ratio.

Figure 4:
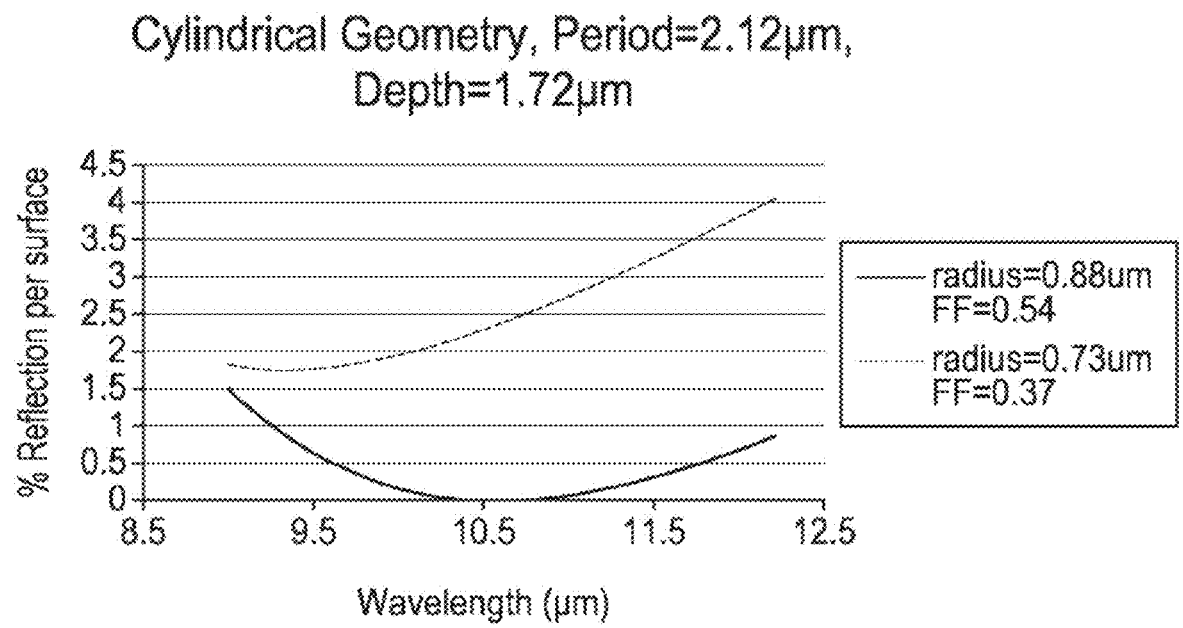
FIG. 4 shows a graph illustrating how reflectivity at 10.6 μm changes with a change in surface geometry, as may be caused by deviations from an ideal surface structure due to imperfect processing during fabrication of an optical element, for an antireflective surface pattern comprising cylindrical projections with a periodicity of 2.12 μm and a depth of 1.72 μm.

FIG. 4 shows a graph illustrating how reflectivity changes with a change in surface geometry, as may be caused by deviations from an ideal surface structure due to imperfect processing during fabrication of an optical element, for an antireflective surface pattern comprising cylindrical projections with a periodicity of 2.12 µm and a depth of 1.72 µm. For this periodicity and depth, at an operating wavelength of 10.6 µm the ideal radius for the cylindrical projections is 0.88 µm as indicated by the lower line in the graph (% reflection is zero at 10.6 µm for this geometry). However, if the geometry of the cylindrical projections deviates from this ideal geometry, for example such that the radius of the cylindrical projections is 0.73 µm, then the reflectivity at an operating wavelength of 10.6 µm is significantly increased as illustrated by the upper line in the graph (% reflection is over 2% at 10.6 µm for this geometry).

Figure 5:
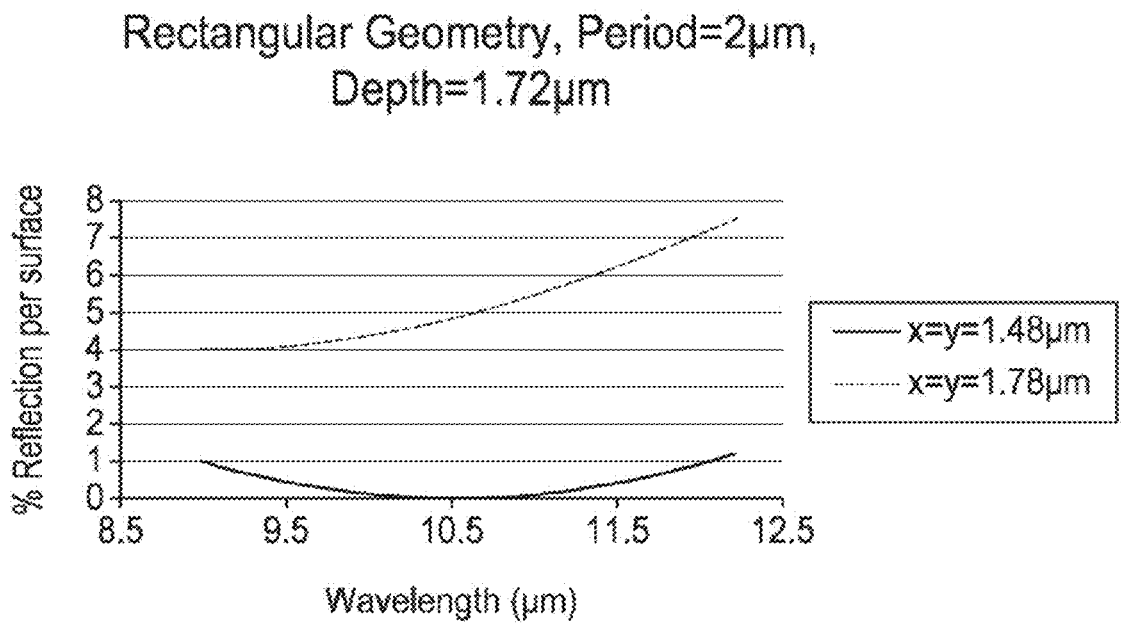
FIG. 5 shows a graph illustrating how reflectivity at 10.6 μm changes with a change in surface geometry, as may be caused by deviations from an ideal surface structure due to imperfect processing during fabrication of an optical element, for an antireflective surface pattern comprising square projections with a periodicity of 2 μm and a depth of 1.72 μm.

FIG. 5 shows a graph illustrating how reflectivity changes with a change in surface geometry, as may be caused by deviations from an ideal surface structure due to imperfect processing during fabrication of an optical element, for an antireflective surface pattern comprising square projections with a periodicity of 2 µm and a depth of 1.72 µm. A similar effect is observed to that illustrated in FIG. 4 for cylindrical projections. For this periodicity and depth, at an operating wavelength of 10.6 µm the ideal side length for the square projections is 1.48 µm as indicated by the lower line in the graph (% reflection is zero at 10.6 µm for this geometry). However, if the geometry of the square projections deviates from this ideal geometry, for example such that the side length of the square projections is 1.78 µm, then the reflectivity at an operating wavelength of 10.6 μm is significantly increased as illustrated by the upper line in the graph (% reflection is approximately 5% at 10.6 μm for this geometry).

Figure 6:
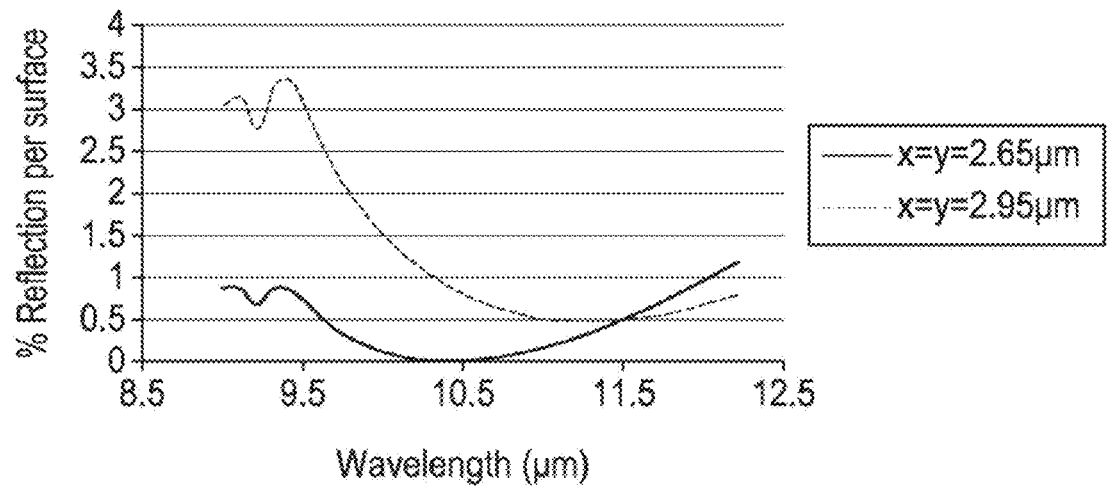
FIG. 6 shows a graph illustrating how reflectivity at 10.6 μm changes with a change in surface geometry, as may be caused by deviations from an ideal surface structure due to imperfect processing during fabrication of an optical element, for an antireflective surface pattern comprising square projections with a periodicity of 4 μm and a depth of 1.72 μm.

FIG. 6 shows a graph illustrating how reflectivity changes with a change in surface geometry, as may be caused by deviations from an ideal surface structure due to imperfect processing during fabrication of an optical element, for an antireflective surface pattern comprising square projections with a periodicity of 4 μm and a depth of 1.72 μm. In comparison to FIGS. 4 and 5, this graph illustrates that an increase in periodicity leads to a reduction in the sensitivity of reflectance to variations in surface geometry. For this periodicity and depth, at an operating wavelength of 10.6 μm the ideal side length for the square projections is 2.65 μm as indicated by the lower line in the graph (% reflection is zero at 10.6 μm for this geometry). If the geometry of the square projections deviates from this ideal geometry, for example such that the side length of the square projections is 2.95 μm, then the reflectivity at an operating wavelength of 10.6 μm increases by only a small amount as illustrated by the upper line in the graph (% reflection is still below 1% at 10.6 μm for this geometry).

Optionally, the diamond optical element may also have one or more of the following characteristics:

- an absorption coefficient measured at room temperature of $\leq 0.5$ cm$^{-1}$, $\leq 0.4$ cm$^{-1}$, $\leq 0.3$ cm$^{-1}$, $\leq 0.2$ cm$^{-1}$, $\leq 0.1$ cm$^{-1}$, $\leq 0.07$ cm$^{-1}$ or $\leq 0.05$ cm$^{-1}$ at a wavelength of 10.6 μm;
- a reflectance, at the surface comprising the antireflective surface pattern, of no more than 2%, 1.5%, 1%, or 0.5% at an operating wavelength of the optical element; and
- a laser induced damage threshold meeting one or both of the following characteristics:
  - the laser induced damage threshold is at least 30 Jcm$^{-2}$, 50 Jcm$^{-2}$, 75 Jcm$^{-2}$, 100 Jcm$^{-2}$, 150 Jcm$^{-2}$, or 200 Jcm$^{-2}$ measured using a pulsed laser at a wavelength of 10.6 μm with a pulse duration of 100 ns and a pulse repetition frequency in a range 1 to 10 Hz; and
  - the laser induced damage threshold is at least 1 MW/cm$^2$, 5 MW/cm$^2$, 10 MW/cm$^2$, 20 MW/cm$^2$, or 50 MW/cm$^2$ measured using a continuous wave laser at a wavelength of 10.6 μm.

Absorbance, reflectance, and laser induced damage threshold of an optical element are readily measurable by those skilled in the art (for example, ISO 21254-2:2011 describes methods for measuring laser induced damage threshold while Sussmann et al. [Diamond and Related Materials, 3, 1173-117, 1994] describe the specific application of laser damage testing to CVD diamond windows).

It should be noted that reflectance for an optical element will be dependent on the operating wavelength and that the anti-reflective surface pattern will be designed to be optimized for a particular operating wavelength. Where the operating wavelength for an optical element is unknown, then a range of wavelengths can be tested to determine where reflectance is minimized and this will correspond to the operating wavelength for the purposes of the present specification. That said, optionally the operating wavelength is selected from one of: 10.6 μm; 1.06 μm; 532 nm; 355 nm; or 266 nm, with an operating wavelength of 10.6 μm being preferred for certain commercial applications.

A synthetic diamond optical element is provided which has low absorbance and low reflectance in combination with low surface damage and an increased laser induced damage threshold. This is considered to be a key combination of parameters for high power laser windows and other high power laser optics such as prisms and lenses.

Optionally, the diamond optical element may also have one or more of the following characteristics:

- a transmittance of at least 95%, 97%, 98% or 99% at the operating frequency of the optical element;
- a total integrated scatter in a forward hemisphere no more than 2%, 1%, 0.5%, or 0.1% at the operating frequency of the optical element;
- a dielectric loss coefficient tan δ measured at room temperature at 145 GHz of $\leq 2\times 10^{-4}$, $\leq 10^{-4}$, $\leq 5\times 10^{-5}$, $\leq 10^{-5}$, $\leq 5\times 10^{-6}$, or $\leq 10^{-6}$;
- an average microfeature density no greater than 5 mm$^{-2}$, 3 mm$^{-2}$, 1 mm$^{-2}$, 0.5 mm$^{-2}$, or 0.1 mm$^{-2}$;
- a microfeature distribution such that there are no more than 5, 4, 3, 2, or 1 microfeatures within any 3 mm$^2$ area;
- an integrated absorbance per unit thickness of no more than 0.20 cm$^{-2}$, 0.15 cm$^{-2}$, 0.10 cm$^{-2}$, or 0.05 cm$^{-2}$, when measured with a corrected linear background in a range 2760 cm$^{-1}$ to 3030 cm$^{-1}$;
- a thermal conductivity of no less than 1800 Wm$^{-1}$K$^{-1}$, 1900 Wm$^{-1}$K$^{-1}$, 2000 Wm$^{-1}$K$^{-1}$, 2100 Wm$^{-1}$K$^{-1}$, or 2200 Wm$^{-1}$K$^{-1}$;
- a silicon concentration as measured by secondary ion mass spectrometry of no more than 10$^{17}$ cm$^{-3}$, 5×10$^{16}$ cm$^{-3}$, 10$^{16}$ cm$^{-3}$, 5×10$^{15}$ cm$^{-3}$, or 10$^{15}$ cm$^{-3}$;
- a nitrogen concentration as measured by secondary ion mass spectrometry of no more than 10$^{18}$ cm$^{-3}$, 5×10$^{17}$ cm$^{-3}$, 5×10$^{16}$ cm$^{-3}$, 10$^{16}$ cm$^{-3}$, 5×10$^{15}$ cm$^{-3}$, or 10$^{15}$ cm$^{-3}$; and
- an oxygen terminated surface.

In relation to the above, it should be noted that microfeatures are micron scale features present in polycrystalline CVD diamond material (i.e. bulk material features rather than surface features) and are believed to be the result of microcracks and/or sp2 carbon within the polycrystalline CVD diamond material. These features can be observed, measured, and counted by optical analysis. The upper limits for microfeature density and distribution for a particular application will be dependent on the size of the microfeatures and on the position of the microfeatures in the diamond optical element. For example, the average microfeature density may be <0.3/mm$^2$ for microfeatures having a diameter range 50 μm to 150 μm, <0.08/mm$^2$ for microfeatures having a diameter range 150 μm to 350 μm, and 0 microfeatures/mm$^2$ for microfeatures with a diameter >350 μm. Furthermore, the microfeature distribution may be such that for microfeatures having a diameter range 50 μm to 150 μm there are no more than 150 microfeatures within a 20 mm diameter of the optical component and no more than 350 microfeatures within a 20 to 40 mm diameter of the optical component. For microfeatures having a diameter range 150 μm to 350 μm there may be no more than 25 microfeatures within a 20 mm diameter of the optical component and no more than 100 microfeatures within a 20 to 40 mm diameter of the optical component. For microfeatures having a diameter greater than 350 μm there may be no microfeatures anywhere in the optical component.

Such optical characteristics can be achieved by applying the patterning technology as described herein to high quality optical grades of synthetic diamond material, such as high quality optical grade polycrystalline CVD diamond available from Element Six Limited. It is also envisaged that the patterning technology may be applied to optical grade single crystal CVD diamond (also available from Element Six Limited) for certain optical applications. Furthermore, in addition to polycrystalline diamond material and single crystal diamond material, the patterning technique as described herein may also be applied to tiled single crystal diamond plates in which a plurality of single crystal diamond substrates are inter-grown to form a single optical plate comprising a plurality of single crystal diamond windows or an effectively single crystal large area diamond plate. The patterning technique may also be applied to hetero-epitaxially grown single crystal diamond material.

Advantageously, the optical element meets one or more of the optical characteristics as described herein over at least 50%, 60%, 70%, 80%, 90%, or 100% of the area of the surface of the diamond optical element on which the anti-reflective diffractive surface finish is formed. In this regard, diamond optical elements can be fabricated to relatively large areas. For example, synthetic diamond components can be fabricated to a have largest linear dimension of at least 5 mm, 10 mm, 20 mm, 40 mm, 60 mm, 80 mm, 100 mm, 120 mm, or 140 mm. Such synthetic diamond components may be fabricated with a thickness equal to or greater than 200 µm, 250 µm, 350 µm, 450 µm, 500 µm, 750 µm, 1000 µm, 1500 µm, or 2000 µm.

Advantageously, the synthetic diamond material is fabricated by growing to a target thickness greater than that required for the final optical element and then processing a nucleation face of the diamond material to remove early stage nucleation diamond. As indicated in the background section, one weakness of prior art approaches is that early stage nucleation diamond is incorporated into the final optical element leading to a reduction in thermal conductance and an increase in optical absorbance. By growing the synthetic diamond material to a target thickness greater than that required for the final optical element it is possible to remove early stage nucleation diamond and thus provide an optical element with higher thermal conductance and lower optical absorbance. Removal of early stage nucleation diamond will inevitably result in a slight reduction in the strength of the synthetic diamond material. However, manufacturers such as Element Six Limited are capable of fabricating thick wafers of synthetic diamond material, such as polycrystalline CVD diamond wafers, with a high tensile rupture strength which enables removal of early stage nucleation diamond while retaining sufficient mechanical strength for end applications. For example, the synthetic diamond material may have one or more of the following structural characteristics:

a tensile rupture strength with a nucleation face of the synthetic diamond material in tension of: ≥760 MPa×n for a thickness of 200 to 500 µm; ≥700 MPa×n for a thickness of 500 to 750 µm; ≥650 MPa×n for a thickness of 750 to 1000 µm; ≥600 MPa×n for a thickness of 1000 to 1250 µm; ≥550 MPa×n for a thickness of 1250 to 1500 µm; ≥500 MPa×n for a thickness of 1500 to 1750 µm; ≥450 MPa×n for a thickness of 1750 to 2000 µm; or ≥400 MPa×n for a thickness of ≥2000 µm, wherein multiplying factor n is 1.0, 1.1, 1.2, 1.4, 1.6, 1.8, or 2; and a tensile rupture strength with a growth face of the synthetic diamond material in tension of: ≥330 MPa×n for a thickness of 200 to 500 µm; ≥300 MPa×n for a thickness of 500 to 750 µm; ≥275 MPa×n for a thickness of 750 to 1000 µm; ≥250 MPa×n for a thickness of 1000 to 1250 µm; ≥225 MPa×n for a thickness of 1250 to 1500 µm; ≥200 MPa×n for a thickness of 1500 to 1750 µm; ≥175 MPa×n for a thickness of 1750 to 2000 µm; or ≥150 MPa×n for a thickness of ≥2000 µm, wherein multiplying factor n is 1.0 1.1, 1.2, 1.4, 1.6, 1.8, or 2.

Such synthetic diamond material may be processed to a surface flatness ≤5 µm, ≤4 µm, ≤3 µm, ≤2 µm, ≤1 µm, ≤0.5 µm, ≤0.2 µm, ≤ or 0.1 µm and/or a surface roughness $R_a$ no more than 200 nm, 150 nm, 100 nm, 80 nm, 60 nm, 40 nm, 20 nm, or 10 nm. In this regard, it may be noted that the $R_a$ limit is in part determined by operating wavelength. The aforementioned limits apply for mid and far IR operating wavelengths. For visible operating wavelengths, the $R_a$ limit will typically be lower. In this regard, it will be noted that for single crystal diamond materials an $R_a$ much lower than 10 nm is achievable.

Further improvements to the thermal conductivity of the synthetic diamond material can be made by reducing the natural 1.1% $^{13}C$ content of the material. As such, the synthetic diamond material may comprise at least a portion which has a $^{13}C$ content of less than 1.0%, 0.8%, 0.6%, 0.4%, 0.2%, 0.1%, 0.05%, or 0.01%. In this regard, it should be noted that isotopically purified carbon source gas is expensive. As such, rather than fabricate the entire optical element from isotopically purified diamond material it can be advantageous to only fabricate a portion of the optical element from isotopically purified diamond material. For example, one or more surface layers of the synthetic diamond material may be formed of isotopically purified diamond material with the interior bulk being fabricated using a higher $^{13}C$ content, preferable natural abundance. In one particularly useful embodiment a surface layer comprising the anti-reflective surface pattern is formed of isotopically purified diamond material so as to increase the thermal conductivity of the anti-reflective surface pattern and thus reduce localized heating and increase the laser induced damage threshold of the anti-reflective surface pattern. An underlying portion of synthetic diamond material may then comprise a higher concentration of $^{13}C$, preferably natural abundance, to reduce synthesis costs.

The anti-reflective surface finish of the present invention may be formed over the majority of a surface of the synthetic diamond material, e.g. over at least 50%, 60%, 70%, 80%, 90%, or over the entire surface. As such, the anti-reflective diffractive surface finish can be formed over an area of at least 25 mm², 50 mm², 100 mm², 200 mm², 300 mm², 500 mm², 700 mm², 1000 mm², 1500 mm², 2000 mm², 3000 mm², 5000 mm², 7000 mm², 10000 mm², 15000 mm², or 20000 mm².

The surface which is patterned with the anti-reflective surface finish may, for example, form the major optical exit and/or entry face of a diamond window, lens or prism with a majority, or the entire, optical exit and/or entry face of the optical element being patterned with an anti-reflective diffractive surface finish. In some applications it may be desirable to leave an unpatterned portion around a peripheral region of the transmissive optical element for mounting the transmissive optical element. Optionally, the anti-reflective surface pattern is formed on at least two surfaces of the synthetic diamond material. For example, the anti-reflective diffractive surface finish can be formed on both the optical entry face and the optical exit face of the optical element, e.g. on opposing major faces of a diamond window. Alternatively, for certain optical elements low reflectance is only required on one surface of the optical element, e.g. a beam splitter where partial reflectance is required on one surface.

The present invention has been described above in the context of providing a synthetic diamond optical element comprising an anti-reflective surface pattern formed directly in the surface of synthetic diamond material. However, as described in the background section of this specification, for certain applications it is required to provide a birefringent optical element and similar problems arise. As such, other embodiments of the present invention provide a synthetic diamond optical element comprising a birefringent surface pattern formed directly in the surface of the synthetic diamond material and which has low surface and subsurface crystal damage thus exhibiting a high laser induced damage threshold. Such birefringent surface patterns can be formed directly in the surface of synthetic diamond material using the fabrication techniques as described herein. The major difference between an antireflective surface pattern and a birefringent surface pattern is that a birefringent surface pattern comprises elongate projections which are used for manipulation of polarization. That said, while their end uses can be quite different, antireflective surface patterns and birefringent surface patterns as described herein follow the same design guidelines in terms of periodicity. It may also be noted that birefringent gratings will also reduce reflections at the surface in which they are disposed, but the reflections will not be reduced to the degree they would be for an optimized antireflective surface pattern. For example, reflection at a birefringent surface pattern will be around 7 or 8% depending on the exact design of the birefringent pattern. Thus, according to certain configurations, an optical element may be provided with a birefringent surface pattern formed in one surface of the synthetic diamond material and an antireflective surface pattern formed in an another surface of the synthetic diamond material.

Birefringent subwavelength gratings can be formed in the surface of synthetic diamond with the necessary etch depth to create either a quarter or half waveplate. This approach has a number of advantages over traditional waveplates. For one, synthetic diamond possesses a very high laser induced damage threshold and is an excellent conductor of heat at room temperatures. This means that a waveplate grating fabricated in diamond can be used in the most demanding high power laser applications without being damaged and without suffering detrimental thermal effects typical of other materials.

A subwavelength grating is a grating where feature periodicity is below the limit where nonzeroth diffraction orders appear. For a plane wave at normal incidence this limit is given by $P<\lambda/\max(n_s, n_i)$ where P=periodicity, $\lambda$=wavelength, $n_s$=refractive index of substrate, and $n_i$=refractive index of incident medium. Because most real world applications involve Gaussian beams and not true plane waves it is best to design a subwavelength grating below 90% of the aforementioned limit i.e. $P<0.9*\lambda/\max(n_s, n_i)$. Because the feature size of a subwavelength grating is small relative to the wavelength of incident light, the grating acts as though it were a uniform medium with a refractive index somewhere between that of the substrate and incident medium.

To make a birefringent subwavelength grating simply requires features with asymmetric dimensions along the x and y axes. The simplest design for a birefringent subwavelength grating is a linear grating where the periodicity of the lines is below the subwavelength limit. Alternatively, other simple designs include structures that are rectangular (but not square) or elliptical. These structures can be etched into the surface of diamond using processing techniques as described herein.

When light interacts with a subwavelength grating the grating is treated as though it were a uniform material with a certain refractive index. The grating can essentially be considered a thin film with an effective refractive index between that of the incident medium and that of the substrate. When the subwavelength grating structures are asymmetric between the x and y axes, the effective index of the grating also becomes asymmetric between the x and y axes. In other words, the asymmetric grating is treated as a birefringent medium with a "fast" and a "slow" axis. By controlling the depth of the birefringent subwavelength grating it is possible to design a grating with a set amount of retardance between polarization states along the fast vs slow axes. By designing the retardance to be either a quarter or half wave makes the grating an effective quarter or half waveplate.

Figure 7:
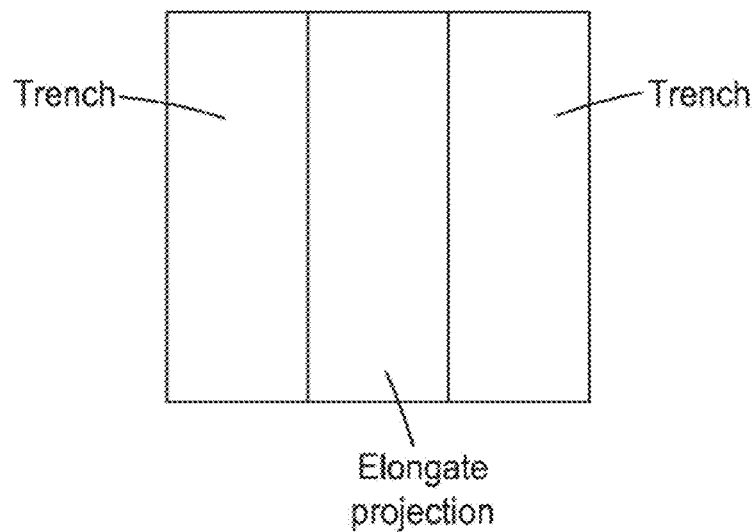
FIG. 7 shows a schematic illustration in plan view of a portion of a birefringent pattern in a surface of a synthetic diamond optical element, the birefringent pattern comprising an elongate projection with elongate trenches disposed either side of the elongate projection.
Figure 8:
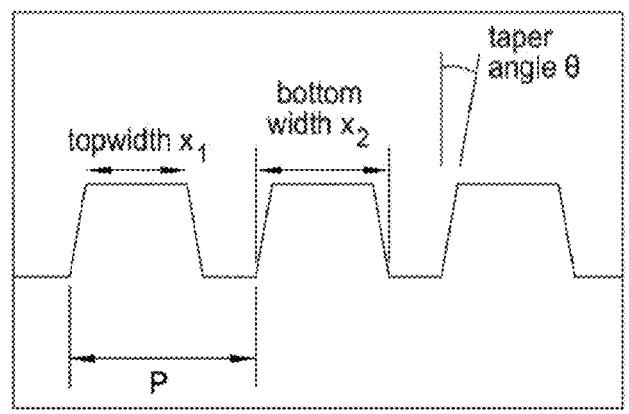
FIG. 8 shows a schematic illustration in cross-sectional view of a birefringent surface pattern having elongate projections which has a trapezoidal cross-sectional shape.

Using optical modelling software it is possible to optimize the design of a birefringent subwavelength grating. This has been done for linear subwavelength gratings which are depicted in FIGS. 7 and 8 since these are the simplest birefringent gratings. FIG. 7 shows a schematic illustration in plan view of a portion of a birefringent pattern in a surface of a synthetic diamond optical element, the birefringent pattern comprising an elongate projection with elongate trenches disposed either side of the elongate projection. FIG. 8 shows a schematic illustration in cross-sectional view of a birefringent surface pattern having elongate projections which has a trapezoidal cross-sectional shape. Optimization is performed by using a 2D parameter sweep over etch depth and linewidth while recording data for amount of retardation and grating transmission. The parameters that give the desired amounts of retardation are then selected out and plotted in terms of transmission. Our optical modelling software has been shown to accurately predict real world results in terms of both transmission and retardance.

Figure 9:
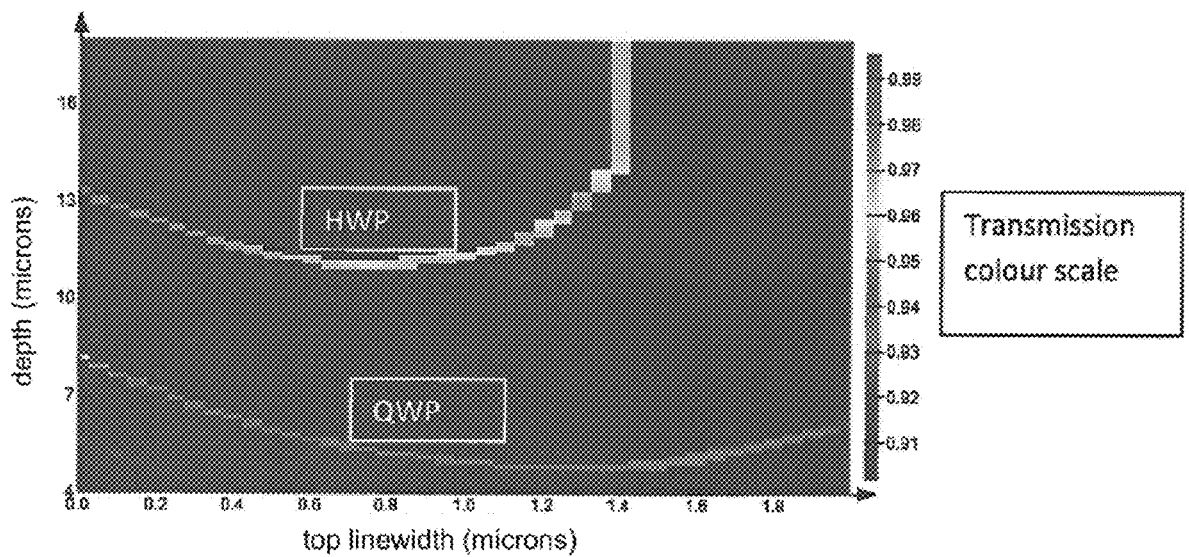
FIG. 9 shows a graph illustrating how transmission changes with line width and etch depth at an operating wavelength of 10.6 μm for a birefringent surface pattern as illustrated in FIG. 8 with a periodicity of 4 μm and a sidewall taper angle of 5°.

FIG. 9 shows transmission vs linewidth and etch depth for parameters that result in either half wave or quarter wave retardance. Optimal design is determined by balance between high transmission and manufacturability. This optimization assumes periodicity of 4 µm, a sidewall taper of 5°, and a design wavelength of 10.6 µm.

Advantages of a birefringent subwavelength grating in diamond over a traditional waveplate include: greater laser induced damage threshold; higher thermal conductivity material; size limited only by available size of diamond windows; and provision of a true zero-order waveplate.

Optical elements fabricated from high quality optical grade synthetic diamond material and comprising an optical surface pattern as described herein are suitable for use in high power optical systems due to their low reflectance and high laser induced damage threshold. As such, there is provided an optical system as illustrated in FIG. 10 comprising:
  a synthetic diamond optical element 10 comprising an optical surface pattern as described herein; and
  a light source 12 (e.g. a laser) configured to generate light 14 at a power of at least 300 W, 500 W, 1 kW, 3 kW, 5 kW, 10 kW, 15 kW, 20 kW, 25 kW, 30 kW, 35 kW, 40 kW, 45 kW, or 50 kW and transmit said light through the synthetic diamond optical element 10.

In relation to the above, it will be noted that the operating power of the described optical system is significantly lower that the previously defined continuous wave laser induced damage threshold of 1 MW/cm$^2$. However, it should be noted that to provide an optical element that has a long operating lifetime the laser induced damage threshold of the synthetic diamond optical element should be significantly higher than the operating power of the optical system.

Laser induced damage threshold (LIDT) is one of the key motivations for embodiments of this invention and is measured in terms of power density. In this regard, it may be noted that high power density does not necessarily mean high operating power although high operating power typically goes with high power density. Current systems are now operating at a power density between 1 and 10 kW/cm² with further increases towards 100 kW/cm² anticipated. If we assume a laser with 20 kW CW power, a 1/e² beam size of 20 mm, 40 mm, or 60 mm, and that the beam is Gaussian (power density at center of window ~2× average power density), then we get CW power densities of 12.7 kW/cm², 3.2 kW/cm², and 1.4 kW/cm² at the center of the synthetic diamond optical window respectively. Peak power densities will then be significantly higher depending on pulse length and repetition rate. Accordingly to embodiments of the optical system illustrated in FIG. 10, the light source 12 (e.g. a laser) may thus be configured to generate light 14 at a power density of at least 1 kW/cm², 3 kW/cm², 5 kW/cm², 10 kW/cm², 20 kW/cm², or 50 kW/cm², and transmit said light through the synthetic diamond optical element 10.

Figure 10:
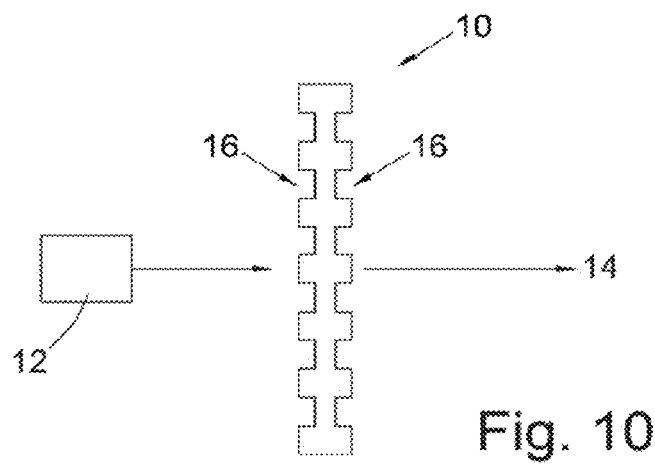
FIG. 10 shows a schematic diagram of a high power laser system comprising a high power laser source and an optical element formed of synthetic diamond material with an optical surface pattern formed directly in a surface of the synthetic diamond material.

In the illustrated embodiment of FIG. 10 the optical element 10 is in the form of a transmissive diamond window with an optical surface pattern 16 fabricated in both major faces of the window.

Optionally, the optical system may also provide a cooling system for cooling the synthetic diamond optical element. In this regard, the present inventors have noted that Element Six's optical grade synthetic diamond material shows a large decrease in absorption at low temperatures. This effect is not seen to the same extent with certain other diamond materials.

In summary, it is believed that optical elements as described herein comprise the key combination of parameters for high power laser windows. As such, embodiments of the present invention are considered to be an enabling technology for high power laser systems. Furthermore, it is also envisaged that optical elements as described herein may be used in broad band visible wavelength applications (e.g. watch faces) where anti-reflective surface finishes may be provided for their mechanical robustness relative to thin film coatings.

While this invention has been particularly shown and described with reference to embodiments, it will be understood to those skilled in the art that various changes in form and detail may be made without departing from the scope of the invention as defined by the appending claims.

The invention claimed is:
1. An optical element comprising:
synthetic diamond material; and
an optical surface pattern formed directly in at least one surface of the synthetic diamond material,
wherein the optical surface pattern comprises a plurality of projections separated by trenches, the projections spaced apart with a periodicity d,
wherein the periodicity d is between 65 and 99% of a zeroeth order diffraction limit above which non zeroeth diffraction orders are observed at an operating wavelength $\lambda$,
wherein the optical surface pattern has a fill fraction in a range 0.1 to 0.6, the fill fraction defined as [area of projection in one periodic unit]/[area of the periodic unit],
wherein the optical element has an absorption coefficient measured at room temperature of ≤0.2 cm⁻¹ at a wavelength of 10.6 µm, and
wherein the optical element has a transmittance of at least 98% at the operating wavelength of the optical element through a thickness of at least 200 µm, and
wherein the optical element has a laser induced damage threshold meeting one or both of the following characteristics:
the laser induced damage threshold is at least 30 Jcm⁻², 50 Jcm⁻², 75 Jcm⁻², 100 Jcm⁻², 150 Jcm⁻², or 200 Jcm⁻² measured using a pulsed laser at a wavelength of 10.6 µm with a pulse duration of 100 ns and a pulse repetition frequency in a range 1 to 10 Hz; and
the laser induced damage threshold is at least 1 MW/cm², 5 MW/cm², 10 MW/cm², 20 MW/cm², or 50 MW/cm² measured using a continuous wave laser at a wavelength of 10.6 µm; and
wherein the operating wavelength $\lambda$ is selected from one of: 10.6 µm; 2.2 µm; 1.06 µm; 532 nm; 355 nm; or 266 nm.

2. An optical element according to claim 1, wherein the periodicity d is no less than 70%, 80%, 85%, or 87% of the zeroeth order diffraction limit.

3. An optical element according to claim 1, wherein the periodicity d is no more than 97%, 95%, or 92% of the zeroeth order diffraction limit.

4. An optical element according to claim 1, wherein the operating wavelength $\lambda$ is 10.6 µm, the zeroeth order diffraction limit is 4.45 µm, and the periodicity d of the optical surface pattern is in a range 3 to 4.40 µm.

5. An optical element according to claim 4, wherein the periodicity d is no less than 3.20 µm, 3.40 µm, 3.60 µm, or 3.80 µm.

6. An optical element according to claim 4, wherein the periodicity d is no more than 4.30 µm, 4.20 µm, or 4.10 µm.

7. An optical element according to claim 1, wherein the trenches of the optical surface pattern have a depth-to-width aspect ratio of less than 3, 2, or 1.5.

8. An optical element according to claim 7, wherein the depth-to-width aspect ratio of the trenches is no less than 1.2.

9. An optical element according to claim 1, wherein the optical element has an absorption coefficient measured at room temperature of ≤0.1 cm⁻¹, ≤0.07 cm⁻¹ or ≤0.05 cm⁻¹ at a wavelength of 10.6 µm.

10. An optical element according to claim 1, wherein the optical element has a total integrated scatter in a forward hemisphere no more than 2%, 1%, 0.5%, or 0.1% at the operating wavelength of the optical element.

11. An optical element according to claim 1, wherein the optical element has one or more of the following characteristics:
an average microfeature density no greater than 5 mm⁻², 3 mm⁻², 1 mm⁻², 0.5 mm⁻², or 0.1 mm⁻²; and
a microfeature distribution such that there are no more than 5, 4, 3, 2, or 1 microfeatures within any 3 mm² area.

12. An optical element according to claim 1, wherein the optical surface pattern is formed in at least one surface of the synthetic diamond material over an area of at least 25 mm², 50 mm², 100 mm², 200 mm², 300 mm², 500 mm², 700 mm², 1000 mm², 1500 mm², 2000 mm², 3000 mm², 5000 mm², 7000 mm², 10000 mm², 15000 mm², or 20000 mm² and wherein the optical element meets the requirements of claim 1 over at least 50%, 60%, 70%, 80%, 90%, or 100% of said area.

13. An optical element according to claim 1,
wherein the optical surface pattern is an antireflective surface pattern.
14. An optical element according to claim 13,
wherein the optical element has a reflectance at said at least one surface of no more than 2%, 1.5%, 1%, or 0.5% at an operating wavelength of the optical element.
15. An optical element according to claim 13,
wherein the optical element has a transmittance of at least 99% at the operating wavelength of the optical element.
16. An optical element according to claim 1,
wherein the optical surface pattern is a birefringent surface pattern.

* * * * *